United States Patent
Ishida et al.

(10) Patent No.: US 6,549,603 B1
(45) Date of Patent: Apr. 15, 2003

(54) METHOD OF CHEMICAL DECONTAMINATION

(75) Inventors: Kazushige Ishida, Hitachi (JP); Kazumi Anazawa, Hitachi (JP); Yoshiyuki Takamori, Hitachinaka (JP); Naohito Uetake, Hitachinaka (JP); Makoto Nagase, Mito (JP); Hiroo Yoshikawa, Sakai (JP); Tadashi Tamagawa, Ebina (JP)

(73) Assignees: Hitachi, Ltd., Tokyo (JP); Kurita Engineering Co., Ltd., Osaka (JP)

( * ) Notice: Subject to any disclaimer, the term of this patent is extended or adjusted under 35 U.S.C. 154(b) by 0 days.

(21) Appl. No.: 09/657,530

(22) Filed: Sep. 8, 2000

(30) Foreign Application Priority Data

Sep. 9, 1999 (JP) .............................. 11-255424

(51) Int. Cl.$^7$ .................................................. G21F 9/00
(52) U.S. Cl. ........................ 376/310; 376/305; 376/306; 376/308
(58) Field of Search .................. 588/1–20; 376/305, 376/306, 309, 310, 308; 134/3, 28, 131; 252/634, 635

(56) References Cited

U.S. PATENT DOCUMENTS

| | | | | |
|---|---|---|---|---|
| 4,729,855 A | * | 3/1988 | Murray et al. ............... | 252/626 |
| 4,756,768 A | | 7/1988 | Bertholdt e tal. ........... | 376/310 |
| 4,942,594 A | * | 7/1990 | Bertholdt et al. ........... | 376/310 |
| 5,073,333 A | * | 12/1991 | Arvesen ..................... | 376/310 |
| 5,093,072 A | | 3/1992 | Guy et al. .................. | 376/310 |
| 5,093,073 A | | 3/1992 | Schenker .................... | 376/310 |
| 5,278,743 A | | 1/1994 | Bengel et al. ............... | 376/310 |
| 5,904,991 A | * | 5/1999 | Hettiarachchi ............. | 428/472.1 |
| 5,958,247 A | * | 9/1999 | Bertholdt et al. ........... | 210/668 |

FOREIGN PATENT DOCUMENTS

| | | | | |
|---|---|---|---|---|
| EP | 0 071 336 | | 2/1983 | ................. 376/310 |
| EP | 0 406 098 | | 1/1991 | ................. 376/310 |
| JP | 50-31300 | | 3/1975 | ................. 376/310 |
| JP | 52-118200 | | 10/1977 | ................. 376/310 |
| JP | 55-66800 | | 5/1980 | ................. 376/310 |
| JP | 58-48900 | | 3/1983 | ................. 376/310 |
| JP | 58-174900 | | 10/1983 | ................. 376/310 |
| JP | 2-503600 | | 10/1990 | ................. 376/310 |
| JP | 6-99193 | | 4/1994 | ................. 376/310 |
| JP | 11-344597 | * | 12/1999 | ................. 376/310 |

* cited by examiner

Primary Examiner—Michael J. Carone
Assistant Examiner—Daniel R. Matz
(74) Attorney, Agent, or Firm—Mattingly, Stanger & Malur, P.C.

(57) ABSTRACT

To suppress a decrease of thickness due to corrosion of structural members and to achieve a removal of radionuclides with good efficiency in a nuclear power plant, oxidation decontamination is first conducted. An aqueous potassium permanganate solution is supplied from a circulation line to a reactor pressure vessel, which is a stainless steel structural member, and a reactor water cleanup system piping and a drain piping, which are carbon steel structural members. These structural members are oxidation-decontaminated by the action of potassium permanganate. Then the above-mentioned structural members are reduction-decontaminated by using an aqueous oxalic acid solution. The aqueous oxalic acid solution contains hydrazine.

17 Claims, 4 Drawing Sheets

METHOD OF CHEMICAL DECONTAMINATION

TECHNICAL FIELD

The present invention relates to a method of chemical decontamination. In more particular, the present invention relates to a method of chemical decontamination which is suitable for an application to boiling water reactor plants (BWR plants) using a boiling water reactor (BWR) and is used for removing radionuclides from surfaces of metallic members of a component and piping of a primary cooling system and a system comprising these which have been contaminated with radionuclides.

BACKGROUND OF THE INVENTION

A known method used for chemically removing radionuclides from surfaces of a component and piping of a primary cooling system of a nuclear power plant (NPP) which contact with a coolant and which have been contaminated with the radionuclides is a method of chemical decontamination using alternately an oxidation decontaminating agent and a reduction decontaminating agent. The radionuclides are incorporated into oxides, which are present on surfaces of the component and piping, such as oxides containing much iron (hereinafter referred to as iron-based oxides), e.g. hematite ($\alpha$-$Fe_2O_3$), nickel ferrite ($NiFe_2O_4$) and magnetite ($Fe_3O_4$), and oxides containing much chromium (hereinafter referred to as chromium-based oxides), e.g. chromium oxide ($Cr_2O_3$) and iron chromite ($FeCr_2O_4$).

The iron-based oxides are readily soluble in acids and reducing agents, and the chromium-based oxides are readily soluble in oxidizing agents. In the method of chemical decontamination, accordingly, in order to remove the iron-based oxides and the chromium-based oxides which are present on the surfaces of piping and components, an oxidation decontaminating agent and a reduction decontaminating agent are alternately used.

A previously known method of chemical decontamination which uses an oxidation decontaminating agent and a reduction decontaminating agent alternately includes a method which chemically decontaminates metallic structural members of a reactor by using permanganic acid as the oxidation decontaminating agent and a dicarboxylic acid, such as oxalic acid, as the reduction decontaminating agent. This method is disclosed in JP-B-3-10919.

Japanese National Publication (Kohyo) No. 2-503600 discloses a method of chemical decontamination applied to a pressurized water reactor. In this method of chemical decontamination, first an oxidation decontamination using an oxidation decontaminating agent containing permanganic acid and chromic acid is conducted and then a reduction decontamination using a reduction decontaminating agent containing oxalic acid is conducted. The Publication discloses also that surface layers which have been changed by the oxidation decontamination, of materials generally used in a nuclear reactor, such as carbon steel, chromium-based stainless steel, nickel alloy and others, are completely removed by the reduction decontamination.

When oxidation decontamination and reduction decontamination are applied to a boiling water reactor plant to decontaminate a component and piping of a primary cooling system contaminated by radionuclides, a reduction decontamination using a reduction decontaminating agent is first conducted and an oxidation decontamination using an oxidation decontaminating agent is performed thereafter. This is because an amount of iron chromite to be dissolved by the oxidation decontaminating agent is small and iron oxides, such as hematite, to be dissolved by the reduction decontaminating agent are present in a large amount.

A boiling water reactor plant comprises structural members manufactured with stainless steel and structural members manufactured with carbon steel. Carbon steel is more readily dissolved by a reduction decontaminating agent, e.g., an oxalic acid solution, than stainless steel.

Magnetite of an iron-based oxide, which is formed much on a surface of a structural member in hot water, also dissolves more readily in oxalic acid solution than iron-based oxides such as hematite and nickel ferrite. In a boiling water reactor plant, therefore, chemical decontamination is presently applied only to parts of structural members manufactured with stainless steel.

SUMMARY OF THE INVENTION

The object of the present invention is to provide a method of chemical decontamination which can suppress a decrease of thickness due to corrosion of structural members in a nuclear power plant and can attain a removal of radionuclides with good efficiency.

To achieve the above-mentioned object, the method of the present invention comprises, in a nuclear power plant provided with a first structural member having a surface which contacts with a coolant and is made of stainless steel and a second structural member having a surface which contacts with a coolant and is made of carbon steel or an iron-based alloy containing chromium and being inferior in corrosion resistance to the stainless steel, first supplying an oxidation decontaminating solution containing an oxidation decontaminating agent into the first structural member and the second structural member and thereafter supplying a reduction decontaminating solution containing a reduction decontaminating agent into the first structural member and the second structural member.

Since an oxidation decontamination using an oxidation decontaminating solution is conducted first, a magnetite in an oxide film formed on a surface of the structural member changes into hematite, which is difficult to be dissolved by a reduction decontaminating solution. Consequently, even when a reduction decontamination using a reduction decontaminating solution is conducted after the oxidation decontamination, a decrease of thickness of the structural member due to corrosion is reduced. Moreover, since the decontamination of the first structural member and that of the second structural member can be conducted in parallel, the removal of radionuclides can be achieved with good efficiency even when structural member parts formed of different kinds of materials are the objects of decontamination.

Each of reference numerals in figures represents as follows.

3 . . . circulation line, 4 . . . water quality monitoring apparatus, 5 . . . circulating pump, 7 . . . heater, 11 . . . cation exchange resin column, 15 . . . catalyst column, 16 . . . oxidation decontaminating agent tank, 22 . . . oxidizing agent supply equipment, 26 . . . reduction decontaminating agent tank, 29 . . . pH controlling agent tank, 32 . . . oxidation decontaminating agent supply equipment, 33 . . . reduction decontaminating agent supply equipment, 34 . . . pH controlling agent supply equipment, 36 . . . reactor pressure vessel, 38 . . . core shroud, 40 . . . reactor water cleanup system piping, 46 . . . drain piping, 51 . . . recirculation system piping.

DETAILED DESCRIPTION OF THE INVENTION

One preferred embodiment of the present invention comprises first supplying, at a state that the first structural member and the second structural member are communicated to each other, an oxidation decontaminating solution containing an oxidation decontaminating agent into the first structural member and the second structural member and thereafter, at a state that the first structural member and the second structural member are communicated to each other, supplying a reduction decontaminating solution containing a reduction decontaminating agent into the first structural member and the second structural member. According to this embodiment, the above-mentioned beneficial effects can be obtained and moreover, since the respective decontaminating solutions are supplied to the first structural member and the second structural member communicated to each other, there is no need to supply the respective decontaminating solutions to each of the structural members separately. Therefore, a supply of the respective decontaminating solutions to the first structural member and the second structural member can be conducted in a simple manner.

In another preferred embodiment of the present invention, the nuclear power plant is one which has experienced the HWC (hydrogen water chemistry) operation. In a nuclear power plant which has experienced the HWC operation, an oxide film formed on a surface of a structural member of the plant which contacts with a coolant has a small thickness. The thickness of the oxide film is small particularly in a second structural member. By conducting the oxidation decontamination first, a magnetite in the oxide film is changed into difficulty soluble hematite; resultantly, even in a nuclear power plant which has experienced the HWC operation, an amount of a decrease of thickness due to corrosion of the structural members, particularly the second structural member, decreases.

Further, radioactive cobalt which is present in the form of complex oxides with chromium in the oxide film of the first structural member is changed into a readily elutable form by oxidation decontamination, so that it is easily eluted by a next reduction decontamination. Consequently, an efficiency in removing radionuclides is improved markedly.

Another preferred embodiment of the present invention is that the above-mentioned reduction decontaminating solution contains hydrazine. Since the reduction decontaminating solution contains hydrazine, pH of the reduction decontaminating solution is mildened from an acid side to a neutral side. Consequently, an amount of a corrosion of a base material of the structural members, particularly the second structural member, can be reduced.

Another preferred embodiment of the present invention is that a temperature of the oxidation decontaminating solution is in a range higher than 70° C. and lower than 100° C. Since the temperature of the oxidation decontaminating solution is higher than 70° C., an elution of oxides by the action of the reduction decontaminating solution is suppressed, and an amount of a decrease of thickness of the structural members due to corrosion is decreased further.

Moreover, since the temperature of the oxidation decontaminating solution is lower than 100° C., an occurrence of spots not decontaminated is suppressed owing to a vapor of the oxidation decontaminating solution. Desirably, the temperature of the oxidation decontaminating solution is in a range not lower than 75° C. and lower than 100° C. Since the temperature of the oxidation decontaminating solution is not lower than 75° C., an amount of a decrease of thickness due to corrosion of the structural members is markedly reduced.

Another preferred embodiment of the present invention is that after a completion of the reduction decontamination with the reduction decontaminating solution, the reduction decontaminating agent contained in the reduction decontaminating solution is subjected to a decomposition treatment. Since the reduction decontaminating agent is converted into water and carbon dioxide as a result of the decomposition, an amount of radioactive wastes produced decreases markedly.

Another preferred embodiment of the present invention is that, after a completion of the reduction decontamination with the reduction decontaminating solution, the reduction decontaminating agent and the hydrazine contained in the reduction decontaminating solution are subjected to a decomposition treatment. Since hydrazine is converted into nitrogen and water as a result of the decomposition, this greatly contributes to a suppression of an amount of radioactive wastes produced.

Another preferred embodiment of the present invention is that the above-mentioned decomposition treatment is conducted with the acid of a catalyst in the presence of an oxidizing agent. Still another preferred embodiment of the present invention is that the decomposition treatment of the reduction decontaminating agent is conducted by an ultraviolet irradiation in the presence of an oxidizing agent.

The present inventors have made extensive study on chemical decontamination, that is, chemical decontamination comprising a reduction decontamination and an oxidation decontamination, for a boiling water reactor plant which has experienced the HWC (hydrogen water chemistry) operation. The present invention has been achieved on the basis of new finding obtained by the study. Results of the study are described in detail below.

Figure 2:
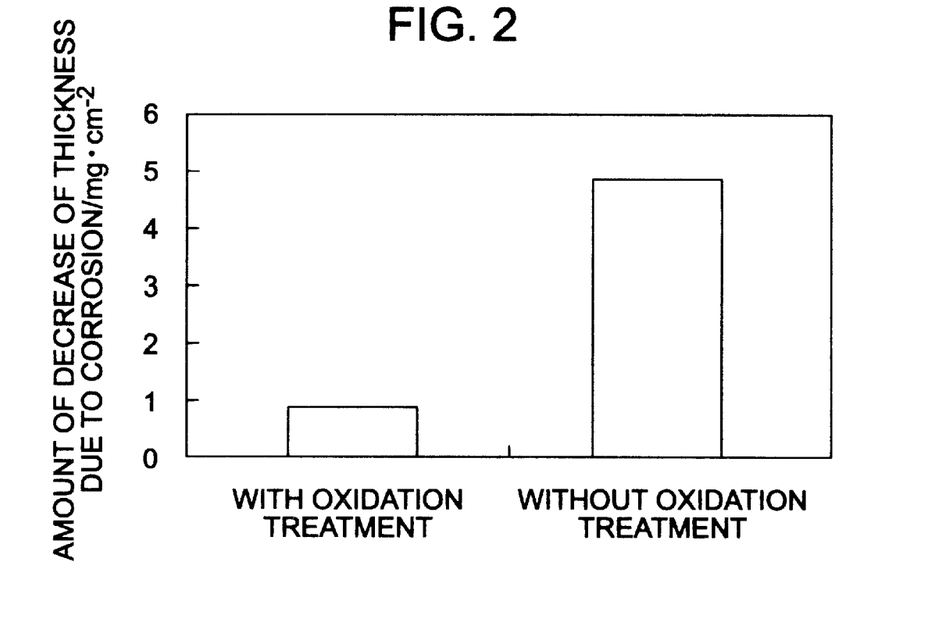
FIG. 2 is an explanatory drawing comparing the respective decreases of thickness due to corrosion observed when the oxidation decontamination is conducted first and when the reduction decontamination is conducted first.

First, influences of the oxidation decontamination and the reduction decontamination on carbon steel were examined. Results of experiments are shown in FIG. 2. An aqueous $KMnO_4$ solution containing 500 ppm of $KMnO_4$ of an oxidation decontaminating agent was used as an oxidation decontaminating solution, and an aqueous oxalic acid solution containing 2000 ppm of oxalic acid of a reduction decontaminating agent and being adjusted to pH 2.5 with hydrazine was used as a reduction decontaminating solution. The oxidation decontamination was conducted by dipping a test piece of carbon steel in the oxidation decontaminating solution. The reduction decontamination was conducted by dipping the test piece in the reduction decontaminating solution. The result in FIG. 2 indicated by "without oxidation treatment" shows an amount of a decrease of thickness of a test piece (carbon steel) due to corrosion observed when the test piece of carbon steel was subjected, in successive order, to 6 hours of reduction decontamination, 2 hours of oxidation decontamination, 6 hours of reduction decontamination, 3 hours of oxidation decontamination and 6 hours of reduction decontamination (a total decontamination period of time was 25 hours).

The result in FIG. 2 indicated by "with oxidation treatment" shows an amount of a decrease of thickness of the test piece due to corrosion observed when the test piece was additionally subjected, before the first reduction decontamination in the above experiment indicated by "without oxidation treatment", to 3 hours of oxidation decontamination. A total decontamination period of time in the experiment indicated by "with oxidation treatment" was 28 hours. As is apparent from the Figure, by conducting oxidation decontamination first, an amount of a decrease of thickness of carbon steel due to corrosion can be reduced to about ⅕ as compared with a case that reduction decontamination is conducted first.

Figure 3:
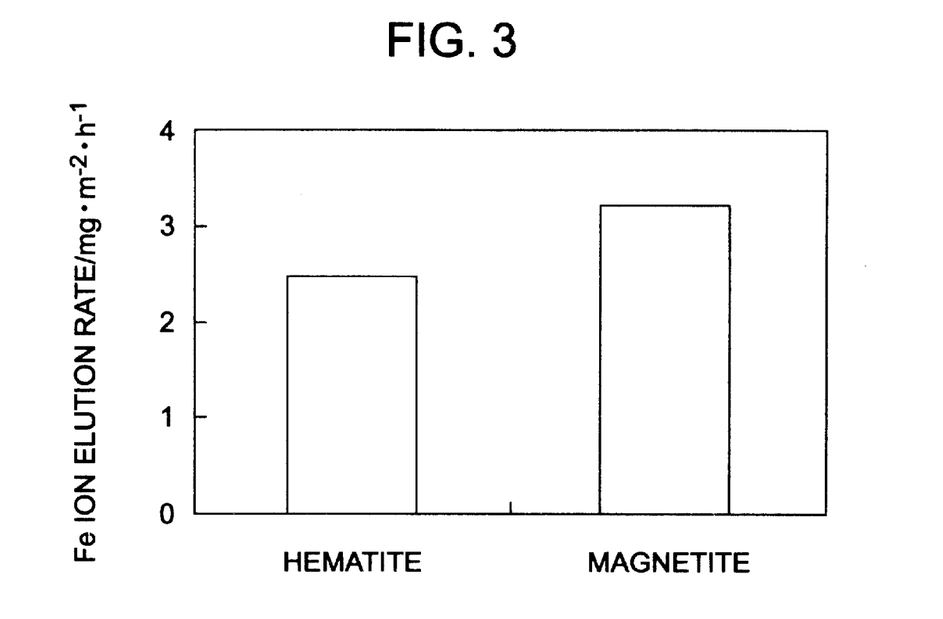
FIG. 3 is an explanatory drawing showing elution rates of iron ions from hematite and magnetite in a reduction decontaminating solution.

Then, magnetite ($Fe_3O_4$) and hematite ($\alpha$-$Fe_2O_3$) were separately dipped in an aqueous oxalic acid solution (a reduction decontaminating solution) containing 2000 ppm of oxalic acid and being adjusted to pH 2.5 with hydrazine. Respective dissolution rates of magnetite and hematite into the aqueous oxalic acid solution were confirmed. FIG. 3 shows the respective dissolution rates of magnetite and hematite. Though magnetite and hematite are both an iron-based oxide, hematite showed a smaller dissolution rate than magnetite.

From the results of the above experiments, the reason why the amount of a decrease of thickness of carbon steel due to corrosion was reduced to about ⅕ by conducting oxidation decontamination prior to reduction decontamination is considered that the magnetite present on a surface of the carbon steel changed, by being oxidized with $MnO_4(-)$ ions in the oxidation decontaminating solution, into hematite, which is relatively difficulty soluble in aqueous oxalic acid solution. That is, it is considered that the following reaction of the formula 1 took place.

$$3Fe^{2+} + MnO_4^- + 4H^+ \rightarrow Fe^{3+} + MnO_2 + 2H_2O \qquad (1)$$

Table 1 shows reduction potentials of Fe(3+) and $MnO_4$(-), reduction potentials of oxidation decontaminating agents having a reduction potential sufficiently large to reduce Fe(2+) to Fe(3+), and reaction formulas thereof.

TABLE 1

Reduction potentials of respective reduction reactions at 25° C.

| Reaction formula | Reduction potential (V) |
| --- | --- |
| $Fe^{3+} + e^- = Fe^{2+}$ | 0.771 |
| $MnO_4^- + 4H^+ + 3e^- = MnO_2 + 2H_2O$ | 1.679 |
| $Ce^{4+} + e^- = Ce^{3+}$ | 1.72 |
| $Cr_2O_7^{2-} + 14H^+ + 6e^- = 2Cr^{3+} + 7H_2O$ | 1.232 |
| $Co^{3+} + e^- = Co^{2+}$ | 1.92 |
| $ClO_3^- + 6H^+ + 6e^- = Cl^- + 3H_2O$ | 1.451 |
| $BrO_3^- + 6H^+ + 6e^- = Br^- + 3H_2O$ | 1.423 |
| $IO_3^- + 6H^+ + 6e^- = I^- + 3H_2O$ | 1.085 |
| $O_3 + 2H^+ + 2e^- = O_2 + H_2O$ | 2.076 |
| $H_2O_2 + 2H^+ + 2e^- = 2H_2O$ | 1.776 |

Calculation of Gibbs free energy in the reaction of the formula 1 by using the values shown in Table 1 gives a negative value of −267 kJ/mol. Therefore, the reaction of the formula 1 is a reaction can sufficiently take place thermodynamically.

From the results described above, in the chemical decontamination of structural members manufactured with carbon steel, it is advisable to conduct oxidation decontamination using an oxidation decontaminating agent prior to conducting reduction decontamination using a reduction decontaminating agent. In this way, an amount of a decrease of thickness of carbon steel due to corrosion, which takes place when the carbon steel is exposed to a reduction decontaminating agent, can be suppressed.

An experiment was carried out by using the same oxidation decontaminating solution and reduction decontaminating solution as used in the case of the above carbon steel but using sensitized SUS 304 for the test piece. An amount of a decrease of thickness of the test piece due to corrosion determined by the experiment is shown in FIG. 4.

Figure 4:
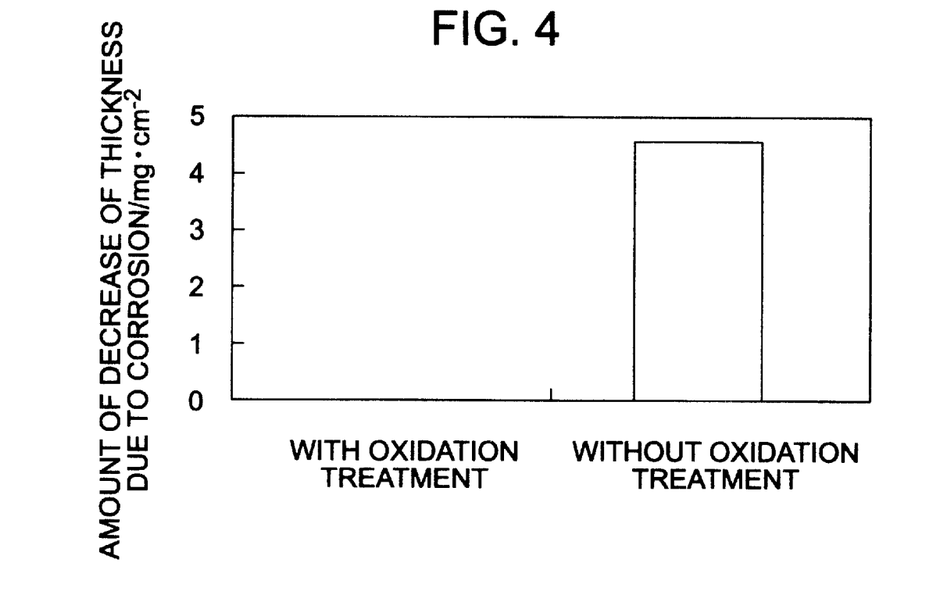
FIG. 4 is an explanatory drawing comparing the respective decreases of thickness due to corrosion observed when the oxidation decontamination is first applied to sensitized SUS 304 and when the reduction decontamination is first applied thereto.

The result in FIG. 4 indicated by "without oxidation treatment" shows an amount of a decrease of thickness of the test piece (sensitized SUS 304) due to corrosion observed when the test piece was subjected, in successive order, to 8 hours of reduction decontamination, 4 hours of oxidation decontamination, 8 hours of reduction decontamination, 4 hours of oxidation decontamination and 8 hours of reduction decontamination (a total decontamination period of time was 32 hours).

The result indicated by "with oxidation treatment" shows an amount of a decrease of thickness due to corrosion of the test piece observed when the test piece was additionally subjected, before the first reduction decontamination in the experiment indicated by "without oxidation treatment", to 4 hours of oxidation decontamination. Also in the case of sensitized SUS 304, the effect of suppressing an amount of a decrease of thickness due to corrosion can be observed as well as in the case of carbon steel. In the experiment "with oxidation treatment", an amount of a decrease of thickness of sensitized SUS 304 due to corrosion is zero. This is conceivably because the decrease in thickness, due to corrosion, of Cr-deficient sites resulting from a deposition of chromium carbide ($Cr_{23}C_6$) caused by the sensitization was suppressed.

Although not shown in FIGS. 2 and 4, also in the case of iron-based alloys which are inferior in corrosion resistance to stainless steel (iron-based alloys having a Cr content less than 13% by weight), a similar effect of suppressing an amount of a decrease of thickness due to corrosion occurs by conducting oxidation decontamination first.

In recent years, the HWC operation has come to be applied to boiling water reactor plants. In a boiling water reactor plant subjected to the HWC operation, an oxide film formed on a surface of structural member is in a state different from an oxide film formed in a structural member of a boiling water reactor plant which is not subjected to the HWC operation. A boiling water reactor plant comprises a structural member having a surface which contacts with a coolant (in the form of liquid or gas) and is formed of stainless steel and a structural member manufactured with carbon steel.

The structural members having a surface, which contacts with a coolant and is formed of stainless steel, include a reactor pressure vessel having an inner surface which contacts with a coolant and is formed of stainless steel, in-core structure made of stainless steel installed in the reactor pressure vessel (e.g., a core shroud, jet pump, steam separator, steam drier and the like), structural members made of stainless steel of the recirculation system connected to the reactor pressure vessel (e.g., recirculation system piping, recirculation pump, and the like) and structural members made of stainless steel of feed water system (e.g., feed water system piping and the like).

The structural members manufactured with carbon steel include structural members of reactor water cleanup system respectively connected to the reactor pressure vessel (e.g., reactor water cleanup system piping and the like), structural members of residual heat removal system (e.g., residual heat removal system piping and the like) and structural members of drain piping system (e.g., drain piping etc.) The reactor pressure vessel is constructed by lining stainless steel on the inside wall of carbon steel of the structural material.

In the above-mentioned structural members made of stainless steel including the reactor pressure vessel, surfaces which contact with the coolant become surfaces which contact with the decontaminating solutions, e.g., the oxidation decontaminating solution, reduction decontaminating solution, and the like. The structural members made of carbon steel are those having a surface which contacts with the coolant and is formed of carbon steel and having a surface which contacts with the coolant and becomes a surface which contacts with the decontaminating solution.

In an operation that the coolant in the reactor by the HWC operation is made reductive, divalent iron resulting from an oxidation of iron contained in the structural member made of carbon steel is difficult to be oxidized into trivalent iron, so that much magnetite is formed on the surface of the structural member. However, since divalent iron is more readily soluble than trivalent iron, the thickness of oxide film of divalent iron formed on the surface of the structural member when the HWC operation has been conducted is smaller than in the case where no HWC operation has been conducted. Therefore, when the surface of a structural member made of carbon steel contacts with the reduction decontaminating agent, not only the oxide film of divalent iron but also the iron of the base material may possibly dissolve out.

However, judged on the basis of the results of experiments shown in FIG. 3, the dissolution of iron of the base material in chemical decontamination can be suppressed by converting the magnetite formed on the surface of structural members into hematite.

On the surface of a structural member wherein the surface which contacts with a coolant is formed of stainless steel (hereinafter referred to as stainless steel structural member) is formed oxides film including chromium-based oxides as the effect of the HWC operation. $Co^{58}$ and $Co^{60}$ (hereinafter referred to as radioactive cobalt), which are radionuclides, are incorporated into the chromium-based oxides in the form of complex oxides with Cr.

When the HWC operation is not conducted, on the other hand, Cr in the oxide film dissolves into cooling water in the form of chromic acid, and virtually no chromium-based oxide is contained in the oxide film. In this case, radioactive cobalt is incorporated into the film of iron-based oxides in the form of complex oxides with Fe. Also in structural members made of carbon steel, radioactive cobalt is incorporated into the film of iron-based oxides in the form of complex oxides with Fe.

As the results of the above investigation, the present inventors have newly found that by starting chemical decontamination with oxidation decontamination, the problems in the chemical decontamination of structural members made of carbon steel and structural members wherein the surface which contacts with the coolant is formed of stainless steel can be solved and the both kinds of structural members can be chemically decontaminated together. Said problems include the suppression of the decrease of thickness of structural members made of carbon steel due to corrosion and the early removal of radionuclides from stainless steel structural members.

For example, by feeding a decontaminating solution supplied into the reactor pressure vessel into the structural member of the reactor water cleanup system and circulating the decontaminating solution between the reactor pressure vessel and the reactor water cleanup system, the reactor pressure vessel, which is a stainless steel structural member, and the structural member of the reactor water cleanup system made of carbon steel can be chemically decontaminated together. At this instance, it is needless to say that oxidation decontamination is to be conducted first and reduction decontamination is to be conducted thereafter.

When an oxidation decontaminating agent contacts with the internal surface of the reactor pressure vessel and the surface of in-core structure such as core shroud, the chromium-based oxides contained in the oxide film of the surface dissolve into the oxidation decontaminating agent. At this time, $Cr^{51}$ of a radionuclide is removed from these structural members.

The radioactive cobalt forming complex oxides with chromium is converted by the action of the oxidation decontaminating agent into a readily elutable form and remains in the oxide film. The oxidation decontaminating agent then flows into the reactor water cleanup system.

The oxide film of magnetite formed on the surface of the structural member (made of carbon steel) of the reactor water cleanup system contacts with the oxidation decontaminating agent, and is converted by the action of the oxidation decontaminating agent into difficulty soluble hematite. Consequently, in the reduction decontamination conducted after the oxidation decontamination, the surface of the structural member of the reactor water cleanup system is covered by difficulty soluble hematite, so that the rate of elution of hematite by the action of the reduction decontaminating agent is low and the decrease of thickness of the base material due to corrosion can be suppressed. Further, the radioactive cobalt remaining in the oxide film of the internal surface of the reactor pressure vessel and the surface of the in-core structure is eluted by the reduction decontaminating agent.

Figure 5:
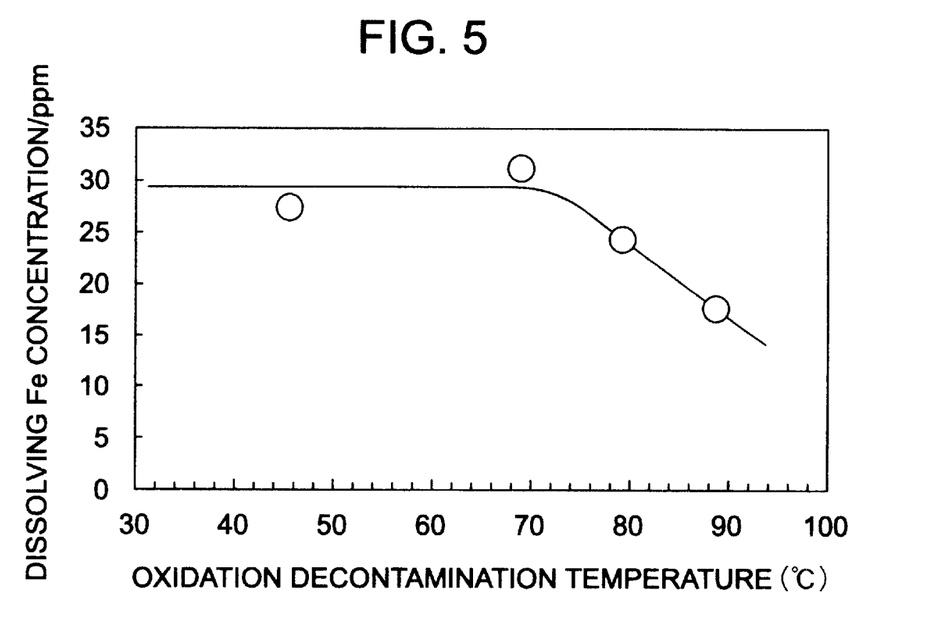
FIG. 5 is a graph showing a relation between a temperature of oxidation decontamination and a dissolving iron concentration.

The present inventors have further examined the effect of temperature in oxidation decontamination. The results of the examination are described below. FIG. 5 shows the results of experiment conducted to examine the effect of temperature in oxidation decontamination. The test piece used in the experiment was magnetite considered to be forming the oxide film on the carbon steel surface and was used after made into the form of pellets.

The test piece was dipped in an aqueous solution containing 500 ppm of potassium permanganate for 4 hours and thereafter dipped in an aqueous oxalic acid solution of pH 2.5 containing hydrazine for 4 hours. As to the temperature in oxidation decontamination, the above-mentioned experiment was conducted in 4 cases wherein the temperature of the aqueous potassium permanganate solution was varied to the temperatures of 4 points indicated by the symbol ○ in FIG. 5. In any of the cases, however, the temperature of the aqueous oxalic acid solution is kept constant at 95° C.

After 4 hours of dipping in the aqueous oxalic acid solution, the concentration of iron dissolving in the aqueous oxalic acid solution was determined. The concentrations of dissolving iron in the 4 cases are indicated by the respective symbols ○ in FIG. 5. When the temperature of the oxidation decontaminating solution (aqueous potassium permanganate solution) at the time of oxidation decontamination exceeds 70° C., the concentration of dissolving iron decreases. This result signifies that when the temperature of the oxidation decontaminating solution exceeds 70° C., the amount of eluted iron is decreased also by reduction decontamination. This is because, since magnetite changes into hematite, the elution of iron is suppressed.

However, when the temperature of the oxidation decontaminating solution reaches 100° C., the oxidation decontaminating solution boils and turns into vapor. When vapor is evolved, in the case where a horizontal portion is present in the objective part for decontamination of the objective plant for decontamination as in a BWR plant, the upper side surface of the horizontal portion contacts with the vapor and comes not to contact with the oxidation decontaminating solution. Consequently, oxidation decontamination for the surface comes not to be achieved and, also in the reduction decontamination conducted thereafter, the decontamination of the surface comes not to be achieved sufficiently. Accordingly, the temperature of the oxidation decontaminating solution in oxidation decontamination is preferably in a range higher than 70° C. and lower than 100° C.

By selecting the temperature within the above-mentioned range, the amount of magnetite formed on the surface of the structural member of the objective part for decontamination, which changes into hematite, increases. Accordingly, the decrease of thickness due to corrosion of the structural members decreases. The temperature of the oxidation decontaminating solution is desirably in a range not lower than 75° C. and lower than 100° C. When the temperature of the oxidation decontaminating solution is raised to 75° C. or above, the decrease of thickness due to corrosion of the structural member decrease markedly. In either of the temperature ranges, since the temperature is lower than 100° C., there is no possibility of developing not oxidation-decontaminated parts owing to the effect of vapor. When the temperature of the oxidation decontaminating liquid reaches 90° C., the concentration of dissolving iron becomes ½ of that at 60° C.

EXAMPLES

A specific example of the method of chemical decontamination of the present invention performed on the basis of the new finding described above is explained below.

A method of chemical decontamination which represents a preferred example of the present invention applied to a boiling water reactor plant (hereinafter referred to as BWR plant) is described with reference to FIG. 1. The chemical decontamination apparatus used in the present example is equipped with a circulation line (i.e. circulation conduit) 3, and the circulation line 3 is provided, in the following order, with a water quality monitoring apparatus 4, circulating pump 5, flow meters 6 and 10, heater 7, cation exchange resin column 11, catalyst column 15, oxidizing agent supply equipment 22, oxidation decontaminating agent supply equipment (i.e. feeder) 32, reduction decontaminating agent supply equipment 33 and pH controlling agent supply equipment 34. The water quality monitoring apparatus 4 measures the pH and electroconductivity of the decontaminating solution introduced into the circulation line 3.

The circulating pump 5 circulates the decontaminating solution in the objective structural members for decontamination of the BWR plant and in the circulation line 3. The flow meter 7 measures the flow rate of the decontaminating solution which flows in the circulation line 3. The heater 7 heats the decontaminating solution to the predetermined temperature.

The cation exchange resin column 11 is filled inside with a cation exchange resin, which is a kind of ion exchange resin, and removes radionuclide ions and metal ions dissolved in the decontaminating solution. The part of the circulation line 3 between the heater 7 and the cation exchange resin column 11 is provided with a valve 8 and a flow meter 10. A valve 54 is provided to the circulation line 3 at the downstream side of the cation exchange resin column 11.

The both ends of a bypass line 3A provided with a valve 9 are connected to the circulation line 3 so as to bypass the flow meter 10, valve 8, cation exchange resin column 11 and valve 54. The catalyst column 15 filled with a catalyst decomposes the reduction decontaminating agent contained in the decontaminating solution. The part of the circulation line 3 between the valve 54 and the catalyst column 15 is provided with a valve 12 and a flow meter 14. A valve 55 is provided to the circulation line 3 at the downstream side of the catalyst column 15. The both ends of the bypass line 3A provided with a valve 13 are connected to the circulation line 3 so as to bypass the valve 12, flow meter 14, catalyst column 15 and valve 55.

The oxidizing agent supply equipment 22 is connected to the circulation line 3 in between the flow meter 14 and the catalyst column 15. The oxidizing agent supply equipment 22 has a hydrogen peroxide tank 23 and a flow rate control valve 24.

A reduction decontaminating agent decomposition apparatus is constituted of the catalyst column 15 and the oxidizing agent supply equipment 22. A vent 21 is connected to the circulation line 3 at a downstream side of the valve 55 to discharge gases (mainly carbon dioxide) evolved by the decomposition of the reduction decontaminating agent. A waste water discharge line 20 having a valve 35 is connected to the circulation line 3. The waste water discharge line 20 discharges the waste water (mainly pure water) resulting from the decomposition of the decontaminating agent.

The oxidation decontaminating agent supply equipment 32 is provided with an oxidation decontaminating agent tank 16 filled with an oxidation decontaminating agent, valve 17 and valve 18. The reduction decontaminating agent supply equipment 33 is provided with a reduction decontaminating agent tank 26 filled with a reduction decontaminating agent, pump 27 and valve 28. The pH controlling agent supply equipment 34 is provided with a pH controlling agent tank 29 filled with a pH controlling agent, pump 30 and valve 31.

The outline of the structure of a BWR plant which constitutes the object of chemical decontamination is described below. The BWR plant is provided with a reactor pressure vessel 36, which is a reactor vessel, having a core built therein. The reactor pressure vessel 36 has in its inside a core 37 charged with a fuel assembly (not shown in the figure). A core shroud 38 encloses the core 37. A plurality of jet pumps 39 are placed in a circular space formed between the core shroud 38 and the reactor pressure vessel 36. Water supply piping 62 of the feed water system is connected to the reactor pressure vessel 36.

The water supply piping (i.e. feed water piping) 62 is provided with valves 61 and 63. As to the recirculation system, recirculation system piping 51 is connected at one end to the reactor pressure vessel 36 and opens at the other end above the jet pump 39. A recirculation pump 53 and a valve 52 are provided to the recirculation system piping 51. To reactor water cleanup system piping 40 of the reactor water cleanup system are communicated the recirculation system piping 51 and water supply piping 62.

A valve 41, pump 42, valve 44 and demineralizer 45 are provided to the reactor water cleanup system piping 40. A valve 56 is provided to the reactor water cleanup system piping 40 at a downstream side of the demineralizer 45. Bypass piping 40A which bypasses the valve 44, the demineralizer 45 and the valve 56 is connected to the reactor water cleanup system piping 40. A valve 43 is provided to the bypass piping 40A.

Drain piping 46 of the drain piping system connects the bottom of the reactor pressure vessel 36 and the reactor water cleanup system piping 40. A valve 47 is provided to the drain piping 46. A number of control rod driving equipment housings 48 are placed at the bottom of the reactor pressure vessel 36. Control rod driving equipments (not shown in the figure) are placed in the control rod driving equipment housings 48.

Though not shown in the figure, a residual heat removal system is provided to the BWR plant. The residual heat removal system is a system which, at the time of stopping the operation of the reactor, removes the heat retained by the cooling water in the reactor pressure vessel 36 after the stopping.

The residual heat removal system has, though not shown in the figure, residual heat removal system piping which connects the recirculation system piping 51 with the reactor pressure vessel 36, and is further provided to the residual heat removal system piping with a heat exchanger, which is a cooling apparatus. The system consists of a plurality of systems and has a function of introducing the cooling water in the reactor pressure vessel 36 from the recirculation system piping 51 into the residual heat removal system piping, cooling the water with the heat exchanger and returning it into the reactor pressure vessel 36.

The outline of the situation of a BWR plant during operation is explained below. Cooling water, which is a coolant in the form of liquid, is supplied from the water supply piping 62 into the reactor pressure vessel 36. By driving of the recirculation pump 53, a part of the cooling water in the reactor pressure vessel 36 flows into the recirculation system piping 51, increases its pressure by the action of the recirculation pump 53, and is discharged into the jet pump 39. Owing to the discharged flow, cooling water in the surroundings is sucked into the jet pump 39 and led to the core 37.

While the cooling water goes upward in the core 37, it is heated by the heat generated by nuclear fission of the nuclear fuel material to change into steam. The steam, which is a coolant in the form of gas, which has been removed of its moisture with a steam separator and a steam drier, is discharged from the upper part of the reactor pressure vessel 36 and led to a turbine (not shown in the figure).

In the reactor pressure vessel 36 is formed a liquid level of cooling water, and the internal surface of the reactor pressure vessel 36 higher than the level is in contact with the above-mentioned steam. In the present BWR plant, during operation, the HWC operation is conducted through the water supply piping 62 in order to suppress the corrosion of the in-core structure in the reactor pressure vessel 36. The HWC operation is not conducted during the stop of operation of the BWR plant.

Chemical decontamination for a BWR plant is conducted after the operation of such a BWR plant has been stopped. The procedures of the chemical decontamination operation are described in detail below. After stop of the plant, the upper cover of the reactor pressure vessel 36 is detached, the fuel assembly in the core 37 is taken out of the reactor pressure vessel 36 and moved into a fuel storage pool (not shown in the figure). Thereafter, a decontaminating solution discharger 65 is temporary provided to the upper part of the reactor pressure vessel.

The decontaminating solution discharger 65 is connected to the outlet side of the circulation line 3 of the chemical decontaminating apparatus through a temporary line 66. The inlet side of the circulation line 3 is connected to a temporary line 71. The temporary line 71 is branched into temporary lines 72, 73 and 74. The temporary line 72 is connected to the reactor water cleanup system piping 40 between the pump 42 and the valve 44. The temporary line 73 is connected to the drain piping 46 at a downstream side of the valve 46. The temporary line 74 is connected to the control rod driving equipment housing 48.

The valves 8, 12, 43, 44, 54, 55 and 61 are closed. A valve 68 is opened, and water is filled through a water supply tube 67 into the circulation line 3. The inside of the circulation line 3 and the temporary lines 66, 71, 72, 73 and 74 are filled with water.

The insides of the reactor pressure vessel 36, reactor water cleanup system piping 40, drain piping 46 and recirculation system piping 51 are filled with cooling water from the beginning.

The pump 5 is driven to circulate water through the circulation line 3, temporary line 66, reactor pressure vessel 36 and temporary line 71 in the above-mentioned order. Between the reactor pressure vessel 36 and the temporary line 71, water flows through three routes of (1) recirculation system piping 51, reactor water cleanup system piping 40 and temporary line 72, (2) drain piping 46 and temporary line 73, and (3) control rod driving equipment housings 48 and 74. While being circulated, water is heated to 90° C. with the heater 7.

First, oxidation decontamination is conducted. The valves 8, 12, 18, 28, 31, 35, 43, 44, 54, 55 and 61 are closed, and the valves 9, 13, 41, 47 and 52 are open. The valve 68 is closed and the valve 18 is opened. The pump 17 is driven, and the aqueous potassium permanganate ($KMnO_4$) solution of the oxidation decontaminating solution is supplied from the oxidation decontaminating agent tank 16 to the circulation line 3.

The temperature of the aqueous potassium permanganate solution which flows in the circulation line 3 is 90° C. When the potassium permanganate concentration in the aqueous potassium permanganate solution flowing in the circulation line 3 has reached the predetermined concentration, the pump 17 is stopped and the valve 18 is closed. It can be confirmed by the pH and the electroconductivity of the aqueous solution flowing in the circulation line 3 measured with the water quality monitoring apparatus 4 that the concentration of potassium permanganate has reached the predetermined concentration (500 ppm).

The aqueous potassium permanganate solution (oxidation decontaminating solution) is circulated, by means of a circulating pump 5, for the first predetermined period of time, through a predetermined route which passes the circulation line 3 and the reactor pressure vessel 36. In this way, the insides of the reactor pressure vessel 36, reactor water cleanup system piping 40, drain piping 46 and control rod driving equipment housing 48 are oxidation-decontaminated by the action of potassium permanganate.

The valve 52 is open, and the recirculation pump 53 is driven. The aqueous potassium permanganate solution in the reaction pressure vessel 36 flows in the recirculation system piping 51 and the jet pump 39. The recirculation system piping 51 and the jet pump 39 are also oxidation-decontaminated. The core shroud 38 in the reactor pressure vessel 36 is also oxidation-decontaminated.

On the surface of the stainless steel structural member which contacts with cooling water are formed complex oxides of radioactive cobalt with Cr by the effect of hydrogen injection.

Chromium-based oxides formed on the stainless steel structural members, e.g., the reactor pressure vessel 36, core shroud 38, jet pump 39, etc., which are in-core structure, and recirculation system piping 51, etc., dissolve out, as described above, by contacting with the oxidation decontaminating solution. At this time, $Cr^{51}$ of a radionuclide also dissolves out.

The radioactive cobalt forming complex oxides with chromium is converted into a readily elutable form by the action of potassium permanganate. The radioactive cobalt is not eluted by the oxidation decontaminating agent, and remains in the oxide film. Among the iron-based oxides present in the oxide film formed on the inner surfaces of the reactor water cleanup system piping 40 and the drain piping 46, magnetite changes into hematite by the action of potassium permanganate.

After completion of the oxidation decontamination of the first predetermined period of time, the oxidation decontaminating agent which affects the reduction decontamination subsequently conducted is decomposed. In the present example, $KMnO_4$ is used as the oxidation decontaminating agent. When metal ions and radionuclide ions dissolving in the decontaminating solution are removed by the cation exchange resin column 11, permanganate ions ($MnO_4(-)$) will deteriorate the performance of the cation exchange resin in the cation exchange resin column 11.

Therefore, the valves 8 and 54 are closed so that the aqueous potassium permanganate solution may not be supplied to the cation exchange resin column 11 during oxidation decontamination. During reduction decontamination, however, since it is necessary to remove these ions, it is necessary to supply the decontaminating solution to the ion exchange resin column 11 by opening the valves 8 and 54. Therefore, in advance to the reduction decontamination, permanganate ions in the aqueous solution are decomposed. The decomposition of permanganate ions are conducted by converting permanganate ions into manganese ions (Mn (2+)) through the reaction of the formula 2 effected by addition of oxalic acid which is used as the reduction decontaminating agent.

(2)

The above-mentioned method for decomposing permanganate ions is convenient because shifting to subsequent step of reduction decontamination also can be done in a short time. Oxalic acid can be supplied in the form of aqueous solution from the oxidation decontaminating agent tank 26 into the circulation line 3 by opening the valve 28 and driving the pump 27. The gas ($CO_2$) evolved by the reaction of the formula 2 is discharged from the vent 21 to the outside of the system.

After completion of the decomposition of the oxidation decontaminating agent, the parts subjected to the above-mentioned oxidation decontamination are reduction-decontaminated. The reduction decontaminating agent is supplied into the circulation line 3. The pump 27 is driven to introduce an aqueous oxalic acid solution of the reduction decontaminating agent from the reduction contaminating agent tank 26 into the circulation line 3. Further, the valve 31 is opened and the pump 30 is driven to supply hydrazine of the pH controlling agent from the pH controlling agent tank 29 into the circulation line 3.

When it has been confirmed by the value measured by the water quality monitoring apparatus 4 that the oxalic acid concentration in the aqueous oxalic acid solution flowing in the circulation line 3 reached a predetermined concentration, the pump 27 is stopped and the valve 28 is closed. The predetermined concentration of oxalic acid is 2,000 ppm.

The injection of hydrazine into the circulation line 3 is conducted until hydrazine breaks through the cation exchange resin column 11. During the reduction decontamination, since the reduction decontaminating solution is not supplied to the catalyst column 15 and moreover no hydrogen peroxide is supplied from the oxidizing agent supply equipment 22, hydrazine is not decomposed in the catalyst column 15. Therefore, hydrazine is not removed by the cation exchange resin and breaks through the cation exchange resin column 11.

When hydrazine has broken through the cation exchange resin column 11, the pump 30 is stopped and the valve 31 is closed. At the situation that hydrazine is breaking through the cation exchange resin column 11, the reduction decontaminating solution contains a predetermined amount of hydrazine and has a pH of 2.5. By means of the circulating pump 5, the aqueous oxalic acid solution containing hydrazine and having a pH of 2.5 (reduction decontaminating solution) is circulated, for the second predetermined period of time, through the same circulation route as that of the oxidation decontaminating solution in the oxidation decontamination. The recirculation pump 53 is also running. During the second predetermined period of time, the same parts as those subjected to oxidation decontamination are reduction-decontaminated.

During the reduction decontamination, the valves 12, 18, 28, 31, 35, 43, 44, 55 and 61 are closed and the valves 8, 9, 13, 41, 47, 52 and 54 are open.

At the time of reduction decontamination, the iron-based oxides present on the surface of the stainless steel structural members are eluted by the action of oxalic acid, which is the reduction decontaminating agent and is a kind of organic acid. At this time, radioactive cobalt, $Mn^{54}$ and $Fe^{59}$, which are radionuclides, present in the oxide film are eluted into the reduction decontaminating solution. Further, in carbon steel structural members which come into contact with the reduction decontaminating solution, e.g. the reactor water cleanup system piping 40 and drain piping 46 etc., the iron-based oxides present on their surface are eluted by the action of oxalic acid. At this time, radioactive cobalt, $Mn^{54}$ and $Fe^{59}$ present in the oxide film of the carbon steel structural member are also eluted into the reduction decontaminating solution.

Metal ions, such as iron ions, and radionuclide ions which have dissolved out from structural members as the result of oxidation decontamination are present as such in the reduction decontaminating solution and further, also as the result of reduction decontamination, metal ions and radionuclide ions dissolve out from structural members.

Owing to the increase of the dissolved radionuclide ions, the surface dose rate of the chemical decontamination apparatus increases. Therefore, based on the value measured by the flow meter 10, the opening of the valve 9 is decreased and the opening of the valve 8 is increased. During the reduction decontamination, the aqueous oxalic acid solution is led to the cation exchange resin column 11. The metal ions and radionuclide ions contained in the aqueous oxalic acid solution are removed by the cation exchange resin in the cation exchange resin column 11.

At the point of time that the second predetermined period has elapsed, the reduction decontamination finishes. Thereafter, the decomposition treatment of the reduction decontaminating agent is conducted. At the time of the decomposition treatment, the valves 9, 13, 18, 28, 31, 35, 43, 44 and 61 are closed and the valves 8, 12, 41, 47, 52, 54 and 55 are open. The reduction decontaminating solution is led to the catalyst column 15. Before the solution is led to the catalyst column 15, a predetermined amount of hydrogen peroxide ($H_2O_2$) is poured from the hydrogen peroxide tank 23 into the reduction decontaminating solution by controlling the opening of the flow control valve 24. Oxalic acid (reduction decontaminating agent) contained in the reduction decontaminating solution is readily decomposed, according to the reaction of the formula 3, in the presence of hydrogen peroxide of an oxidizing agent with the aid of the catalyst present in the catalyst column 15. That is, oxalic acid is converted into carbon dioxide and water by the decomposition.

$$(COOH)_2 + H_2O_2 = 2CO_2 + 2H_2O \qquad (3)$$

Consequently, the amount of radioactive wastes can be reduced. According to the decomposition treatment capacity of the catalyst column 15, the openings of the valves 12 and 13 are controlled based on the value measured by the flow meter 14, to supply the reduction decontaminating solution to the catalyst column 5 at a prescribed flow rate. Also, hydrazine is decomposed into nitrogen and water by the action of hydrogen peroxide and the catalyst. Carbon dioxide evolved by the decomposition of oxalic acid and nitrogen formed by the decomposition of hydrazine are discharged from the vent 21 to the outside of the system. The catalysts filled in the catalyst column 15 are catalyst of noble metals, such as platinum, rhodium, ruthenium and palladium.

It is desirable to use ruthenium, which shows the highest decomposition rate towards the reduction decontaminating agent and hydrazine. When the concentration of the reduction decontaminating agent has decreased to the predetermined value or below (for example, 10 ppm or less) and the concentration of hydrazine has decreased to 5 ppm or below, which is the predetermined value, the valve 13 is opened ad the valves 12 and 55 are closed, and the decomposition treatment of the reduction decontaminating agent is finished.

The concentration of hydrogen peroxide in the reduction decontaminating solution supplied to the catalyst column 15 should be that which is necessary for decomposing oxalic acid and hydrazine. Said concentration of hydrogen peroxide is desirably such that the lower limit is the same molar concentration as the sum of the twice the molar concentration of hydrazine and the molar concentration of oxalic acid and the upper limit is 3 times the molar concentration of said lower limit.

When the hydrogen peroxide concentration exceeds the above-mentioned upper limit value, hydrogen peroxide which has not been decomposed flows out of the catalyst column 15. This hydrogen peroxide may cause the deterioration of the cation exchange resin in the cation exchange resin column 11, resulting in the possibility of developing the re-outflow of the previously captured radionuclide ions and the like. When the hydrogen peroxide concentration decreases below the lower limit value, the decomposition of oxalic acid and hydrazine tends to be insufficient.

Thereafter, the purification step (cleanup step) of purifying the decontaminating solution remaining in the circulation line 3 and objective structural members for decontamination is carried out. The purification step is conducted by using a mixed bed resin column (not shown in the figure) filled with a cation exchange resin and an anion exchange resin which is a kind of ion exchange resin. Though not shown in the figure, a separate bypass line which is arranged in series and connects a cooler and a mixed bed resin column in said order is connected to the part of the circulation line 3 between the flow meter 10 and the valve 8 and to the part of the circulation line 3 between the intersecting point of the bypass line 3A and the circulation line 3 and the valve 54. The bypass line having the mixed bed resin column provided thereto is provided with valves respectively at the upstream side of the cooler and at the downstream side of the mixed bed resin column.

In the purification step, the respective valves of the upstream side of the cooler and of the downstream side of the mixed bed resin column are opened and the valves 8 and 54 are closed. In this purification step, oxalic acid is removed by the mixed bed resin column because remaining oxalic acid of the reduction decontaminating agent adversely influences the subsequent oxidation decontamination. At this time, radionuclide ions and metal ions remaining in the decontaminating solution are also removed by the mixed bed resin column. Since oxalic acid ions are anions, the acid is removed by the anion exchange resin in the mixed bed resin column, whereas radionuclide ions and metal ions are removed by the cation exchange resin.

After completion of respectively one time of oxidation decontamination and reduction decontamination, in case the surface dose rate of the objective structural members for decontamination does not decrease to the predetermined value or below, after the purification step, the above-mentioned oxidation decontamination and the reduction decontamination are alternately conducted repeatedly. The oxidation decontamination and the reduction decontamination may be alternately repeated plural times until the surface dose rate decreases to the predetermined value or below. After the oxidation decontamination, the decomposition of the oxidation decontaminating agent is conducted and, after the reduction decontamination, the decomposition of the reduction decontaminating agent and the purification step are conducted.

According to necessity, the valve 35 is opened to discharge water through the waste water discharge line 20 to the outside of the system.

In the present example, at a state that the stainless steel structural member and the carbon steel structural member are communicated to each other, first the oxidation decontaminating solution is supplied from the side of either the stainless steel structural member or the carbon steel structural member, and thereafter the reduction decontaminating solution is supplied. Consequently, magnetite in the oxide film formed on the surface of structural members changes into hematite, which is difficult to dissolve with the reduction decontaminating solution. Therefore, even when reduction decontamination with the reduction decontaminating solution is conducted after the oxidation decontamination, the decrease of thickness of structural members due to corrosion can be reduced.

Moreover, since the decontamination of the stainless steel structural member and that of the carbon steel structural member can be conducted in parallel, even when different parts of structural members different in material are the objects of decontamination, the radionuclides can be removed with good efficiency. Furthermore, the decontamination of the objective region for decontamination of a nuclear power plant can be completed in a short time.

Further, since the stainless steel structural member and the carbon steel structural member are communicated to each other and the respective decontaminating solutions are supplied through one of the structural members, the supply of the respective decontaminating solutions to the respective structural members can be conducted in a simple manner.

Since the reduction decontaminating solution contains hydrazine, the pH of the reduction decontaminating solution is mildened from the acid side to the neutral side. Consequently, the decrease of thickness due to corrosion of the base material of the structural member, particularly the carbon steel structural member, can be reduced.

In the present example, since the temperature of the oxidation decontaminating solution is 90° C., the decrease of thickness of structural members due to corrosion can be markedly reduced. Further, since the temperature of the oxidation decontaminating solution is lower than 100° C., the development of spots (horizontal parts) not decontaminated owing to the effect of the vapor of oxidation decontaminating solution can be suppressed.

Since the aqueous oxalic acid solution is decomposed into carbon dioxide and water as described above and hydrazine is decomposed into nitrogen and water, the amount of radioactive wastes formed is markedly reduced.

In the present example, hydrazine and oxalic acid can be decomposed in the catalyst column 15, and hence the construction of equipment or the construction of system for the decomposition of the reduction decontaminating agent can be simplified.

Figure 1:
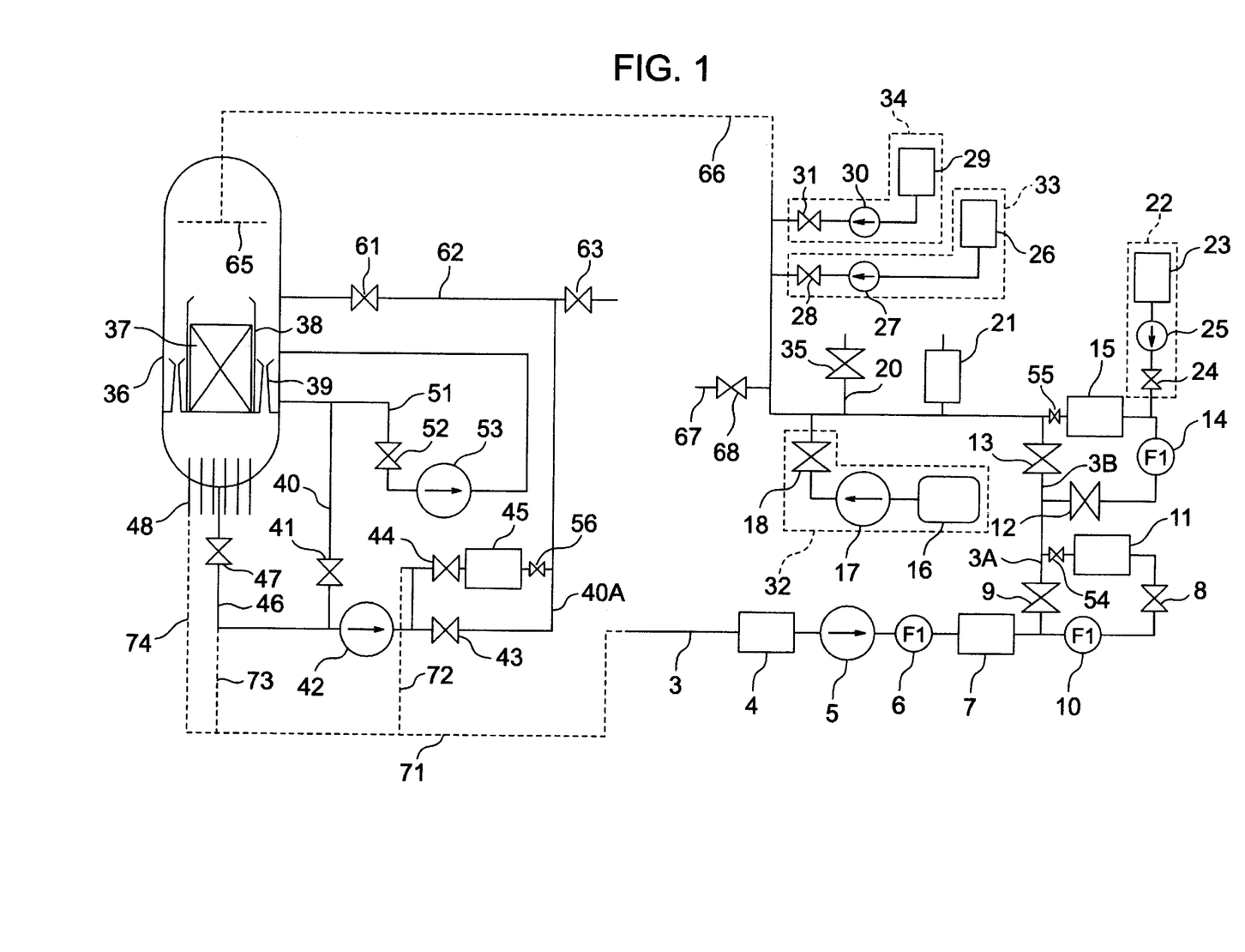
FIG. 1 is a diagram showing a structure of a chemical decontamination apparatus used in the method of chemical decontamination which is a preferred embodiment of the present invention and a state of a connection of the chemical decontamination apparatus with a boiling water reactor plant.

The example shown in FIG. 1 is an example wherein, as the oxidation treatment to be conducted before the reduction decontamination, the same method of oxidation decontamination is applied as that which succeeds to the reduction decontamination. However, in the oxidation decontamination conducted before the reduction decontamination, an aqueous solution containing at least one species of oxidizing agent listed in Table 1 may also be used as the oxidation decontaminating solution.

In the example of FIG. 1, though potassium permanganate was used as the oxidation decontaminating agent, permanganic acid may also be used. Further, an ultraviolet irradiation apparatus may be used in place of the catalyst column 15. By irradiating ultraviolet ray to the reduction decontaminating solution in the presence of hydrogen peroxide with an ultraviolet irradiation apparatus, oxalic acid can be decomposed like by the use of the catalyst column 15. However, when hydrazine is decomposed by ultraviolet irradiation in the presence of hydrogen peroxide, ammonia is formed.

Ammonia adversely affects also the decomposition of oxalic acid, and the decomposition yield of oxalic acid lowers as compared with the case where the catalyst column 15 is used. Accordingly, when an ultraviolet irradiation apparatus is used as the means of decomposing a reduction decontaminating agent which is an organic acid, it is necessary to avoid the use of hydrazine at the time of reduction decontamination. When hydrazine is used to reduce the amount of decrease of thickness due to corrosion of a base material of carbon steel structural members, it is necessary to decompose hydrazine with a decomposition apparatus separate from the ultraviolet irradiation apparatus to avoid the inflow of hydrazine to the ultraviolet irradiation apparatus.

Figure 6:
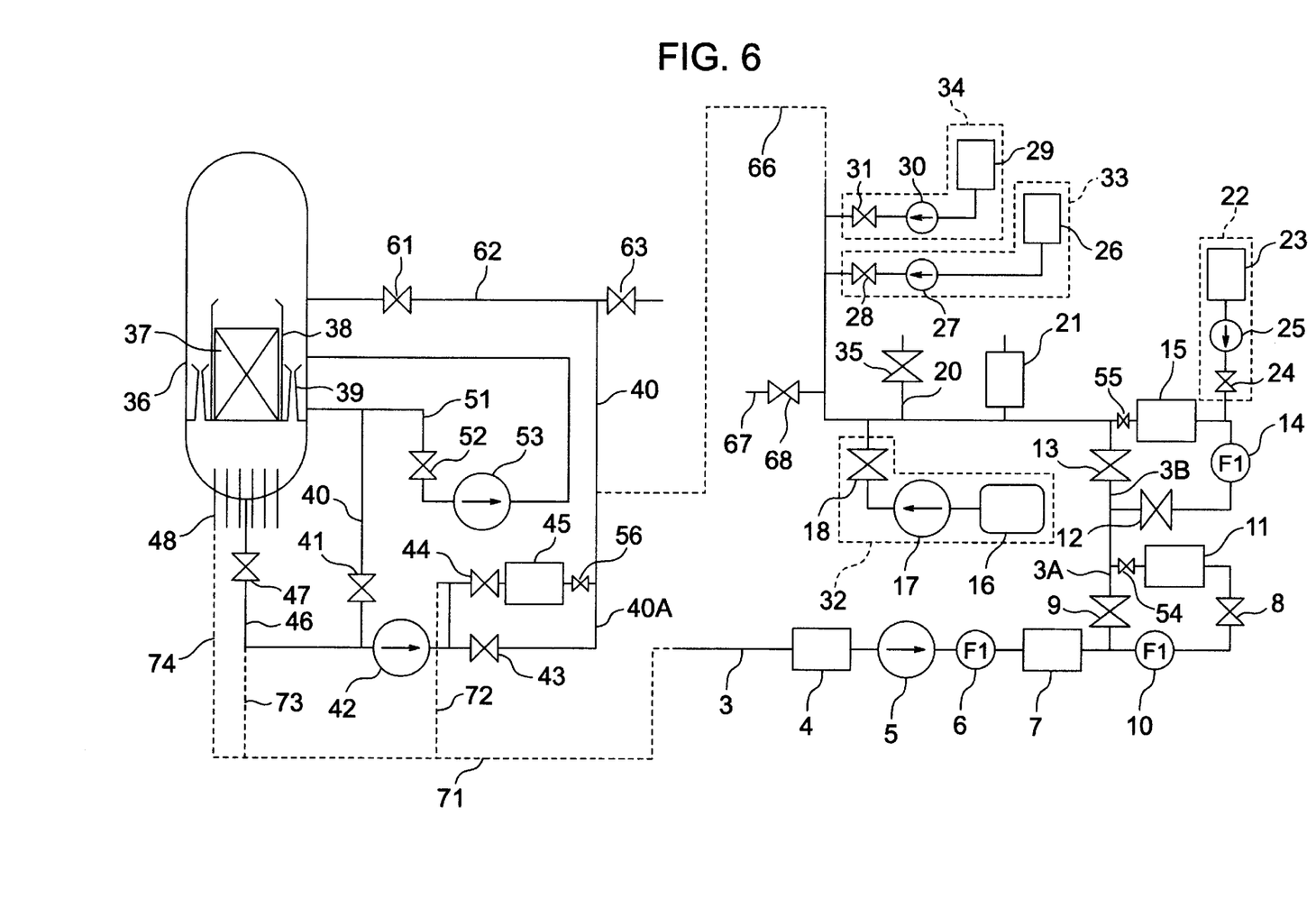
FIG. 6 is a diagram showing a structure of a chemical decontamination apparatus used in the method of chemical decontamination which is another embodiment of the present invention and a state of a connection of the chemical decontamination apparatus with a boiling water reactor plant.

A method of chemical decontamination which is another example of the present invention is described below with reference to FIG. 6. The chemical decontamination apparatus used in this example is connected through a temporary line 66 to the reactor water cleanup system piping 40 of the downstream side of the valve 56. In the present example, the decontaminating solution discharger 65 employed in the example of FIG. 1 is not used.

Also in the present example, as in the example of FIG. 1, chemical decontamination for carbon steel structural members and stainless steel structural members is carried out. In the present example, the oxidation decontaminating solution and the reduction decontaminating solution are introduced from the temporary line 66 into the reactor water cleanup system piping 40 at the downstream side of the valve 56. These decontaminating solutions are supplied through the reactor water cleanup system piping 40 and the water supply piping 62 into the reactor pressure vessel 36. At this time, the valves 56 and 63 are closed. In the present example, the beneficial effects obtained in the example of FIG. 1 can be obtained. In the present example, moreover, the inside of the part of the reactor water cleanup system piping 40 of the downstream side of the valve 56 which is not decontaminated in the example of FIG. 1 can also be decontaminated.

According to the present invention, in a nuclear power plant, the decrease of thickness due to corrosion of the structural members can be suppressed, and the removal of radionuclides can be achieved with good efficiency.

What is claimed is:

1. A method of chemical decontamination which comprises, in a boiling water reactor nuclear power plant provided with a first structural member having a surface which contacts with a coolant and is made of stainless steel and a second structural member having a surface which contacts with a coolant and is made of carbon steel or an iron-based alloy containing chromium and being inferior in corrosion resistance to the stainless steel, pretreating the second structural member with an oxidation decontaminating solution containing an oxidation decontaminating agent applied to both the first structural member and the second structural member, thereby increasing corrosion resistance of the second structural member, and thereafter decontaminating the first structural member and the second structural member with a reduction decontaminating solution containing a reduction decontaminating agent applied to the first structural member and the second structural member, to remove radionuclides from both the first structural member and the second structural member.

2. A method of chemical decontamination which comprises, in a boiling water reactor nuclear power plant provided with a first structural member having a surface which contacts with a coolant and is made of stainless steel and a second structural member having a surface which contacts with a coolant and is made of carbon steel or an iron-based alloy containing chromium and being inferior in corrosion resistance to the stainless steel, pretreating the second structural member with an oxidation decontaminating solution containing an oxidation decontaminating agent applied to both the first structural member and the second structural member at a state that the first structural member and the second structural member are communicated to each other, thereby increasing corrosion resistance of the second structural member, and thereafter decontaminating the first structural member and the second structural member with a reduction decontaminating solution containing a reduction decontaminating agent applied to the first structural member and the second structural member at a state that the first structural member and the second structural member are communicated to each other, to remove radionuclides from both the first structural member and the second structural member.

3. The method of chemical decontamination according to claim 1 wherein the nuclear power plant is a nuclear power plant which has experienced the HWC (hydrogen water chemistry) operation.

4. The method of chemical decontamination according to claim 1 wherein the reduction decontaminating solution contains hydrazine.

5. The method of chemical decontamination according to claim 1 wherein a temperature of the oxidation decontaminating solution is in a range higher than 70° C. and lower than 100° C.

6. The method of chemical decontamination according to claim 5 wherein the temperature of the oxidation decontaminating solution is in a range not lower than 75° C. and lower than 100° C.

7. The method of chemical decontamination according to claim 1 further including, after a completion of a reduction decontamination with the reduction decontaminating solution, the step of subjecting the reduction decontaminating agent contained in the reduction decontaminating solution to a decomposition treatment.

8. The method of chemical decontamination according to claim 4 further including, after a completion of a reduction decontamination with the reduction decontaminating solution, the step of subjecting the reduction decontaminating agent and the hydrazine contained in the reduction decontaminating solution to a decomposition treatment.

9. The method of chemical decontamination according to claim 7 wherein the decomposition treatment is conducted with a catalyst in the presence of an oxidizing agent.

10. The method of chemical decontamination according to claim 7 wherein the decomposition treatment is conducted by an ultraviolet irradiation in the presence of an oxidizing agent.

11. The method of chemical decontamination according to claim 1 wherein the iron-based alloy containing chromium and being inferior in corrosion resistance to the stainless steel is an iron-based alloy containing less than 13% by weight of chromium.

12. The method of chemical decontamination according to claim 1 wherein the reduction decontaminating agent contains at least oxalic acid.

13. The method of chemical decontamination according to claim 1 wherein the oxidation decontaminating agent contains at least one kind of chemical species selected from the group consisting of chemical species having a reduction potential higher than that of from Fe(3+) to Fe(2+).

14. The method of chemical decontamination according to claim 13 wherein the chemical species having a reduction potential higher than that of from Fe(3+) to Fe(2+) is at least one kind of chemical species selected from the group consisting of $MnO_4(-)$, $Ce(4+)$, $Cr_2O_7(2-)$, $HCrO_4(-)$, $BrO_3(-)$, $ClO_3(-)$, $IO_3(-)$, $Co(3+)$, $H_2O_2$ and $O_3$.

15. The method of chemical decontamination according to claim 4 wherein the reduction decontaminating solution contains hydrazine to control the pH of an oxalic acid solution used as a reduction decontaminating agent to about 2.5.

16. The method of chemical decontamination according to claim 1, wherein the pretreating step is performed so that magnetite in an oxide film on the second structural member changes into hematite, thereby increasing the corrosion resistance of the second structural member by resistance of hematite to dissolution by the reductive decontaminating solution.

17. The method of chemical decontamination according to claim 1, wherein the pretreating step is performed so that a corrosion resistant substance forms on the second structural member, thereby increasing the corrosion resistance of the second structural member by resistance of the substance to dissolution by the reductive decontaminating solution.

* * * * *